United States Patent Office 2,835,716
Patented May 20, 1958

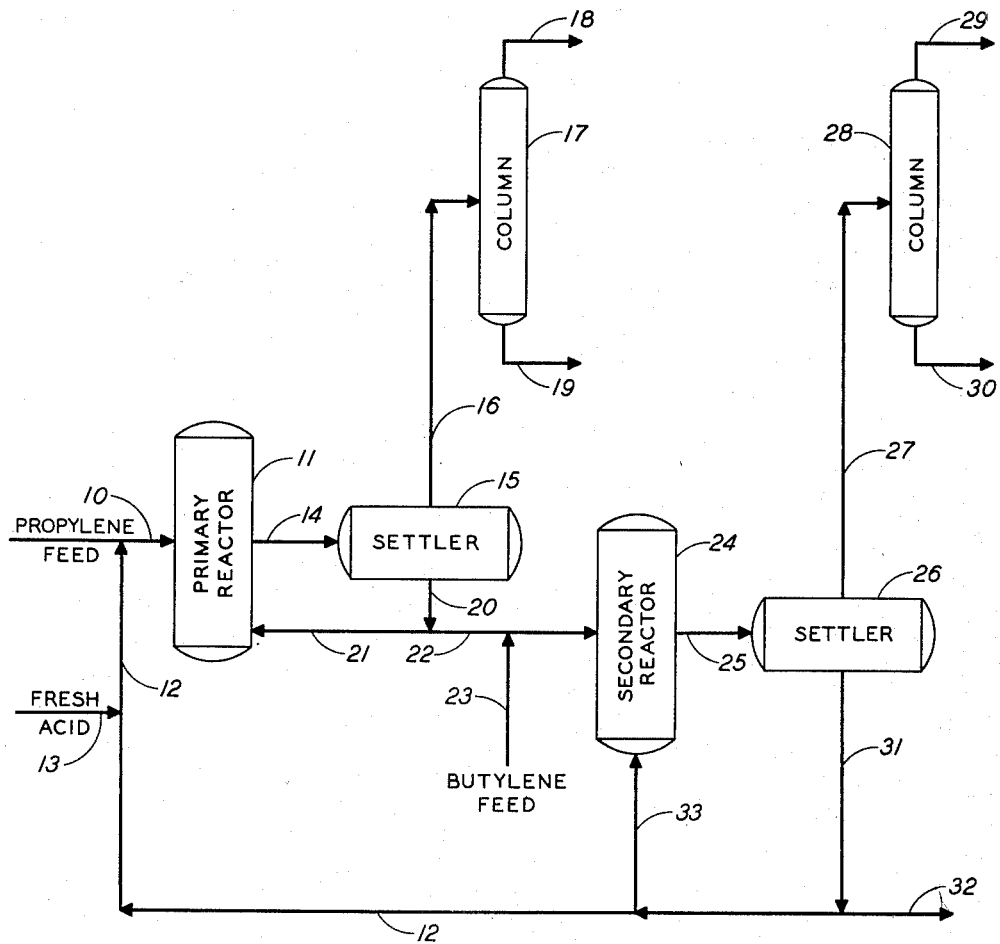

2,835,716

POLYMERIZATION PROCESS EMPLOYING A LIQUID PHOSPHORIC AND CATALYST

Gordon E. Langlois and Jacob D. Kemp, El Cerrito, Calif., assignors to California Research Corporation, San Francisco, Calif., a corporation of Delaware Application December 6, 1954, Serial No. 473,398

11 Claims. (Cl. 260—683.15)

The present invention relates to a process for the polymerization of normally gaseous olefins catalyzed by concentrated liquid phosphoric acid. More particularly, the invention is directed to a method of maintaining the activity of the liquid phosphoric acid catalyst employed in the polymerization reaction.

It is well known that liquid phosphoric acid is an efficient polymerization catalyst, and the use of this catalyst in the production of motor polymers from normally gaseous olefins was suggested more than thirty years ago. More recently, it has been disclosed that precursors of synthetic detergents, such as propylene tetramer, may also be obtained by a liquid phosphoric acid catalyzed polymerization process.

It is known that the activity of phosphoric acid as a polymerization catalyst may be affected by several factors. For example, polar compounds such as ammonia, methyl amine, mercaptans and the like, which are often contained in the olefin feed stream, exert a poisoning effect upon the catalyst which may be remedied by pretreating the feed. Further deactivation of the catalyst normally occurs as a result of the formation of coke and tarry materials in the acid as the polymerization reaction progresses, particularly at high temperatures. Some relief from the latter type of deactivation may be obtained by operating at low temperatures, generally, however, to the detriment of conversion to polymer products.

In the polymerization of propylene, another contributing factor in the deactivation of the phosphoric acid catalyst is the formation of propyl phosphoric acid esters during the polymerization reaction. These esters, which steadily increase in concentration during the initial stages of operation after which an equilibrium is established whereby the ester concentration remains approximately constant, have been found to dissolve in the acid and lower its activity as a catalyst for the polymerization of propylene. In order to alleviate this effect of ester formation, it has been suggested that a portion of the acid be continuously withdrawn from the system and subjected to temperatures of from about 400° to 500° F., at which temperatures decomposition of the esters will occur. However, at such temperatures, phosphoric acid is extremely corosive, and necessitates the use of expensive acid-resistant materials. Additionally, this thermal decomposition method requires the use of extensive safety precautions in order to protect operating personnel against the hazardous conditions involved. A further disadvantage of this method is that the presence of propylene in the acid, resulting from the decomposition of the ester plus the quantity normally entrapped in the acid, promotes coke formation at such temperatures as 500° F., which leads to catalyst deactivation of a type noted hereinbefore.

It is a primary object of the present invention to provide a process for the polymerization of normally gaseous olefins in which the deactivation of the liquid phosphoric acid catalyst by ester formation is substantially reduced.

A further object is to provide a process whereby the activity of the liquid phosphoric acid in respect to ester formation is maintained at a high level without employing the high temperatures suggested in the prior art, and without the use of any added treating step apart from the use of the acid as a polymerization catalyst.

The nature of still other objects of the invention will be apparent from a consideration of the following description:

The present invention is based upon the discovery that the activity of a concentrated phosphoric acid catalyst employed in the polymerization of propylene at temperatures between about 150° and 350° F. can be maintained at a relatively high level by employing a cyclic process wherein the partially spent catalyst from the propylene polymerization zone is circulated, at least in part, to a butylene polymerization zone wherein the activity of the catalyst is rapidly restored, the reactivated catalyst then being recirculated to the propylene polymerization zone. It has been found that the present invention is particularly applicable where both polymerization reactions are conducted in the 150° to 350° F. temperature range, at pressures in the range of from about 200 to 1800 p. s. i. g., and a catalyst concentrations of from 95 to 115%, based upon orthophosphoric acid. Under these conditions, it has been discovered that the acid-deactivating esters present in the phosphoric acid stream withdrawn from the propylene polymerization zone are rapidly decomposed in the butylene polymerization zone, thus obviating the need for heating the acid to such temperatures as approximately 500° F. in order to effect the desired de-esterification.

The invention can be more clearly understood by reference to the appended drawing which is a diagrammatic illustration of a process flow suitable for the practice of the present invention. No attempt is made in the drawing to include any of the necessary pumps, heat exchangers, control equipment and the like, since the location thereof can readily be supplied by those skilled in the art.

Referring now to the drawing, a propylene-containing feed (previously treated, if desired, to remove polar bodies, followed by drying to remove any water present) is continuously introduced by line 10 into primary reactor 11 which comprises a primary polymerization zone. Recirculating liquid phosphoric acid, along with the fresh make-up acid introduced into the system by line 13, is continuously supplied to reactor 11 by line 12. Reactor 11, while illustrated as a conventional reaction vessel, may be any type of apparatus wherein there is sufficient contact time between the feed and the acid under the prevailing process conditions for the desired conversion, and may be a vessel, pump, section of pipe, etc., or any combination thereof.

Following the contacting step, the reaction mixture, comprising unreacted olefins, propylene polymer, phosphoric acid, and esters of the acid, is withdrawn from reactor 11 by line 14 and passed into settler 15 wherein an upper hydrocarbon layer and a lower acid phase are formed. The hydrocarbon layer is passed by line 16 into distillation column 17 wherefrom a fraction containing essentially paraffins and unreacted olefins is withdrawn overhead through line 18, while the bottoms fraction containing the propylene polymer product is withdrawn through line 19 and is passed into storage. If desired, a propylene containing recycle stream may be withdrawn from line 18 and returned to reactor 11. The lower acid phase from settler 15, which contains phosphoric acid esters formed in the propylene polymerization reaction, is withdrawn by line 20 and recycled in part to reactor 11 by line 21, while the balance, along with a butylene-containing feed supplied through line 23 is passed through line 22 into reactor 24 comprising a secondary polymerization zone. Reactor 24 may be similar to reactor 11, the major requirement being that it, as in the case of the primary reactor, provides means for intimately mixing the olefin feed with the acid catalyst. The second reaction mixture, that is, the mixture formed within reactor 24, is withdrawn from the latter and passed by line 25 into a second settler 26 wherein an upper hydrocarbon layer and a lower acid phase is separated. The upper layer is handled in much the same manner as the hydrocarbon layer from settler 15, in that the hydrocarbons are passed by line 27 into distillation column 28 from which unreacted olefins and paraffins are removed overhead by line 29, while the butylene polymer product is removed as bottoms by line 30 and sent to storage.

The lower layer acid phase contained in settler 26 contains essentially no esters of phosphoric acid, the esters present in the acid entering the secondary polymerization zone having been rapidly decomposed therein, while no additional esters are formed during the butylene polymerization reaction. This second acid phase is withdrawn from settler 26 by line 31, from which a portion is withdrawn through line 32 and sent to spent acid storage, while the balance is passed into line 12. If desired, a portion of the acid in line 12 may be recycled to the secondary reactor 24 by line 33, while the remainder, supplemented by fresh acid make-up from line 13 equal to that withdrawn through line 32, is passed into propylene feed line 10 to complete the acid cycle.

According to the present invention, the propylene polymerization reaction effected in the primary polymerization zone is conducted within a temperature range of from about 150 to 350° F., a pressure range of 200 to 1800 p. s. i. g., and an acid range of from about 95 to 115% $H_3PO_4$. It has been found, however, that ester formation is also promoted within these same ranges of temperature and acid concentration. The equilibrium concentration of these esters dissolved in the acid is a function of temperature, acid concentration, and propylene concentration. Thus, it has been found that the ester concentration increases as, (1) the temperature decreases, (2) the acid concentration decreases, and (3) the propylene concentration in the reaction mixture increases, the formation of these undesirable esters being especially high at temperatures below about 300° F., acid concentrations below about 110% $H_3PO_4$, and at propylene concentration in the reaction mixture above about 5%. It has been found that the process of the present invention is particularly effective in propylene conversion reactions conducted under these latter conditions which are especially conducive to ester formation.

In obtaining maximum benefits from the process of the present invention, an important factor is the acid residence time within each of the reactors. The average acid residence time is defined as follows:

Average acid residence time $$= \frac{\text{Volume of acid in the reactor}}{\text{Net rate of acid removal from the reactor}}$$

thus, the acid residence time in the primary reactor is $$= \frac{\text{Volume of acid in reactor 11}}{\text{Net rate of acid removal (line 22)}}$$

and for the secondary reactor, is $$= \frac{\text{Volume of acid in reactor 24}}{\text{Net rate of acid removal (line 31 less line 33)}}$$

We have found that the average acid residence time in the propylene polymerization reactor should be not more than about 30 minutes. When the residence time becomes greater than this, ester formation is excessively high, thereby resulting in a considerable deactivation of the acid catalyst with the attendant undesirable decrease in propylene conversion. Furthermore, the ester content will be such that in order to decompose these esters, unduly long average acid residence times in the butylene reaction zone will be required, the residence time in the latter zone being thus a function of that in the primary, or propylene reaction zone. By operating the propylene polymerization reaction within specified acid residence times of less than 30 minutes, it has been found that good propylene conversions can be obtained and that long residence times in the butylene polymerization zones are unnecessary. We have found that when the propylene acid residence time is about 30 minutes or somewhat less, a butylene residence time of at least 5, and preferably 10, minutes is required to effect substantially complete ester decomposition. However, if the residence time in the primary reactor is maintained in a preferred range of from a few seconds up to 20 minutes, the residence time in the secondary reactor can also be correspondingly reduced if desired, though much longer periods can be employed without harmful effect and, in some cases, with appreciable benefit from the economic standpoint, particularly when the butylene feed stream is appreciably larger than the propylene feed stream.

As noted before, it may be desirable to recycle a portion of the acid phases from each of the settlers back to their respective reactors (lines 21 and 33). However, if this be done, care must be taken that the average acid residence times be maintained within the noted limits. The desirability of such recycle streams depends upon the relative quantities of propylene and butylene feed available. In general it has been found that in order to obtain maximum conversions, it is desirable that the acid-to-hydrocarbon ratio in the reactors be approximately 1, and recycle streams of the type referred to above may be necessary to achieve such a condition. Operation at other acid-to-hydrocarbon ratios is entirely feasible, but a ratio equal to 1 offers best results.

The advantages of the process of the present invention are demonstrated in the following examples. Examples I and II, inserted for comparative purposes only, show the separate polymerization of propylene and butylene respectively. Examples III and IV, conducted pursuant to the subject invention, show that the phosphoric acid catalyst may be maintained at a high activity by limiting the acid residence time in the propylene polymerization reaction to specified limits and thereafter passing the acid into the butylene polymerization zone.

*Example I*

In this example, a feed containing 60 mole percent propylene is passed at a rate of 1.25 v./v./hr. (volumes of feed calculated as liquid, per volume of reactor per hour) into a reactor where it is contacted with 106% $H_3PO_4$. The reaction is maintained at a temperature of 250° F., a pressure of 800 p. s. i. g., and an acid-to-hydrocarbon ratio of 1. The reaction mixture is settled and the acid layer is recycled to the reactor thereby allowing the ester content to build up to equilibrium in the system. The upper hydrocarbon layer is passed to a distillation column and the propylene polymer product is recovered. A propylene conversion of 30% is obtained.

*Example II*

In this example, a feed containing 50 mole percent butylene is passed at a rate of 3 v./v./hr. into a reactor where it is contacted with 106% $H_3PO_4$ under the same conditions of temperature, pressure, and acid-to-hydrocarbon ratio as in Example I. Settling, acid recycle, and polymer recovery are done as in the above example. A butylene conversion of 90% is obtained.

*Example III*

In this example, carried out according to the flow diagrammed in the drawing, all of the polymerization conditions described in Examples I and II are followed except that here the acid flow pattern is changed so as to conform to the process of the present invention. Thus, the propylene-containing feed and the acid are charged to the primary reactor and the resulting reaction mixture passed into the settler wherein the acid and hydrocarbon are separated and the polymer product recovered. The entire acid phase from the settler, which phase contains propylene esters, is passed together with the butylene-containing feed into the secondary reactor and the resulting reaction mixture is passed into the second settler. The butylene polymer is recovered from the upper hydrocarbon layer formed in the settler, and the acid phase, now containing no esters, is returned (employing no acid recycle to reactor 24 by line 33) to the primary reactor. The conversion of propylene in the first polymerization zone is 75% and the conversion of butylene in the second stage is 90%. The average residence time of acid in the primary reactor is 24 minutes; in the secondary reactor, it is 10 minutes.

*Example IV*

This example is carried out exactly as Example III, except the average acid residence time in the propylene polymerization reactor is 10 minutes instead of 24 minutes. The conversion of propylene is 85% and the conversion of butylene in the secondary reactor is 90%.

A comparison of the four examples shows that if the process of the present invention is followed the propylene conversion is increased from 30% to 75–85% without causing any decrease in the butylene conversion of 90%. This conversion increase can only be attributable to the maintenance of a high level of catalyst activity by following the process of the subject invention.

It should also be noted that the subject invention avoids the high temperature acid reactivation operation that has been suggested in the prior art. It can be seen that in the butylene conversion zone the esters present in the acid withdrawn from the propylene reaction zone are decomposed, thus preventing a build-up of esters in the acid, and that this is accomplished at the same temperature as the propylene polymerization reaction, e. g., 250° F., which must be compared with the 500° F. heretofore thought necessary. Thus, the special equipment and hazards attendant to the use of such elevated temperature reactivation have been found to be unnecessary. However, if for any reason it is desired to operate the butylene polymerization reaction at a temperature higher than 250° F., i. e. from 250 to 450° F., decomposition of the ester-containing phosphoric acid is more rapid, thereby allowing the average acid residence time in the secondary reactor to be reduced.

Insofar as the butylene-containing feed stream to the butylene polymerization zone is concerned, an ordinary refinery C₄ stream, which usually contains from about 15 to 75 mole percent butylene, has been found to be an excellent feed. However, this feed should not contain more than 10 mole percent, and preferably less than 5 mole percent, propylene.

We claim:

1. A cyclic process for the polymerization of normally gaseous olefins, which comprises contacting a propylene-containing feed with a liquid phosphoric acid catalyst of a concentration in the range of from about 95 to 115% H$_3$PO$_4$ in a primary polymerization zone at a temperature in the range of from about 150 to 350° F. and at a pressure in the range of from about 200 to 1800 p. s. i. g., continuously recovering from said zone a hydrocarbon phase and an acid phase, passing said hydrocarbon phase to propylene polymer product recovery facilities, contacting at least a portion of said acid phase with a butylene-containing feed in a secondary polymerization zone at a temperature in the range of from about 150 to 350° F. and at a pressure in the range of from about 200 to 1800 p. s. i. g., continuously recovering from said secondary zone a second hydrocarbon phase and a second acid phase, passing said second hydrocarbon phase to butylene polymer product recovery facilities, and continuously returning at least a portion of said second acid phase to said primary polymerization zone to contact further quantities of fresh propylene-containing feed.

2. The process of claim 1 wherein the polymerization reaction temperatures are maintained in the range of from about 200 to 300° F.

3. A cyclic process for the polymerization of normally gaseous olefins, which comprises contacting a propylene-containing feed with a liquid phosphoric acid catalyst of a concentration in the range of from about 95 to 115% H$_3$PO$_4$ in a primary polymerization zone at a temperature in the range of from about 150 to 350° F., a pressure in the range of about 200 to 1800 p. s. i. g., and an acid residence time of not more than 30 minutes, continuously recovering from said zone a hydrocarbon phase and an acid phase, passing said hydrocarbon phase to propylene polymer product recovery facilities, contacting at least a portion of said acid phase with a butylene-containing feed in a secondary polymerization zone at a temperature in the range of from about 150 to 350° F., a pressure in the range of from about 200 to 1800 p. s. i. g., and an acid residence time sufficient to substantially decompose any esters present in the acid phase from said primary zone, continuously recovering from said secondary zone a second hydrocarbon phase and a second acid phase, passing said second hydrocarbon phase to butylene polymer product recovery facilities, and continuously returning at least a portion of said second acid phase along with fresh acid to said primary polymerization zone to contact further quantities of fresh propylene-containing feed.

4. The process of claim 3 wherein the polymerization reaction temperatures are maintained in the range of from about 200 to 300° F.

5. The process of claim 3 wherein the acid residence time in the primary polymerization zone is not more than 20 minutes.

6. The process of claim 3 wherein the acid residence time in the secondary polymerization zone is at least 5 minutes.

7. The process of claim 3 wherein the acid residence time in the secondary polymerization zone is at least 10 minutes.

8. A process for the polymerization of normally gaseous olefins, which comprises contacting a propylene-containing feed with a liquid phosphoric acid catalyst of a concentration in the range of from about 95 to 115% H$_3$PO$_4$ in a primary polymerization zone at a temperature in the range of from about 150 to 350° F., a pressure in the range of from about 200 to 1800 p. s. i. g., and an acid residence time of not more than 30 minutes, continuously withdrawing the resulting reaction mixture from said zone, settling said reaction mixture to separate a hydrocarbon phase and an acid phase containing phosphoric acid and esters of said acid, recovering said hydrocarbon phase, passing a portion of said acid phase back to said primary polymerization zone, contacting the remaining portion of said acid phase with a butylene-containing feed in a secondary polymerization zine at a temperature in the range of from about 150 to 350° F., a pressure in the range of from about 200 to 1800 p. s. i. g., and an acid residence time of at least 5 minutes, continuously withdrawing the resulting second reaction mixture from said secondary polymerization zone, settling said second reaction mixture to separate a second hydrocarbon phase and a second acid phase which is substantially free of esters of phosphoric acid, recovering said second hydrocarbon phase, passing a portion of said second acid phase back to said secondary polymerization zone, and passing the remaining portion of said second acid phase, along with fresh phosphoric acid, to said primary polymerization zone to contact further quantities of fresh propylene-containing feed.

9. The process of claim 8 wherein the acid residence time in the primary polymerization zone is not more than 20 minutes.

10. The process of claim 8 wherein the acid residence time in the secondary polymerization zone is at least 10 minutes.

11. The process of claim 9 wherein the acid residence time in the secondary polymerization zone is at least ten mintues.

References Cited in the file of this patent
UNITED STATES PATENTS

| | | |
|---|---|---|
| 2,425,493 | Stapleton | Aug. 12, 1947 |
| 2,547,013 | Kemp et al. | Apr. 3, 1951 |
| 2,592,428 | Kemp et al. | Apr. 8, 1952 |